July 26, 1932.
D. F. NEWMAN
1,868,759
PROJECTION SCREEN
Filed July 21, 1926
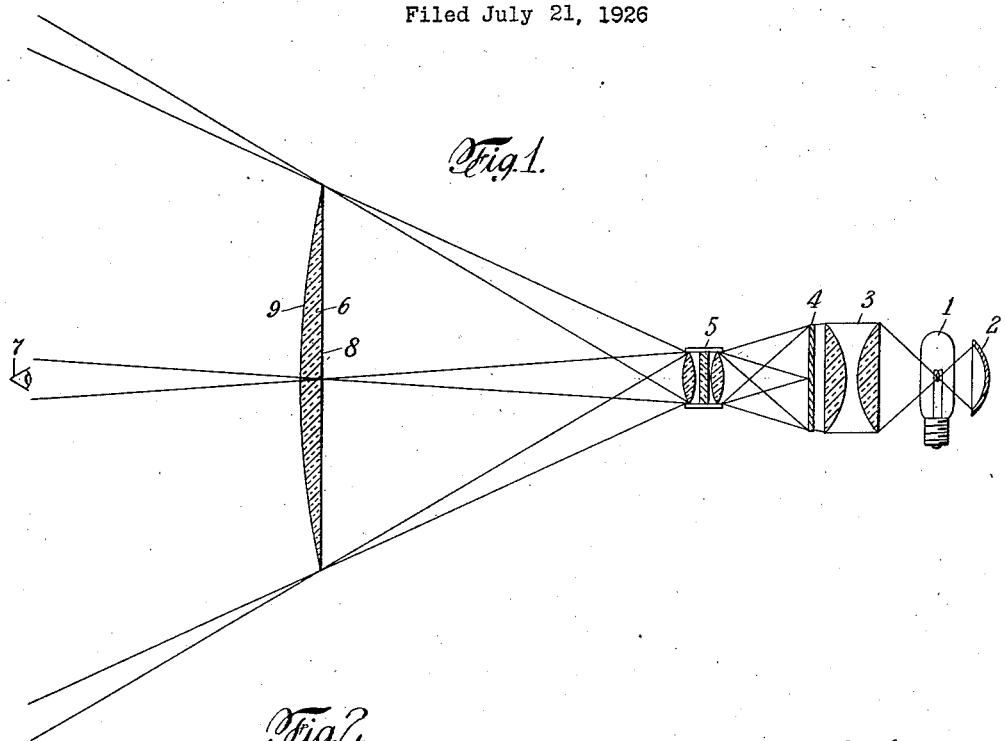
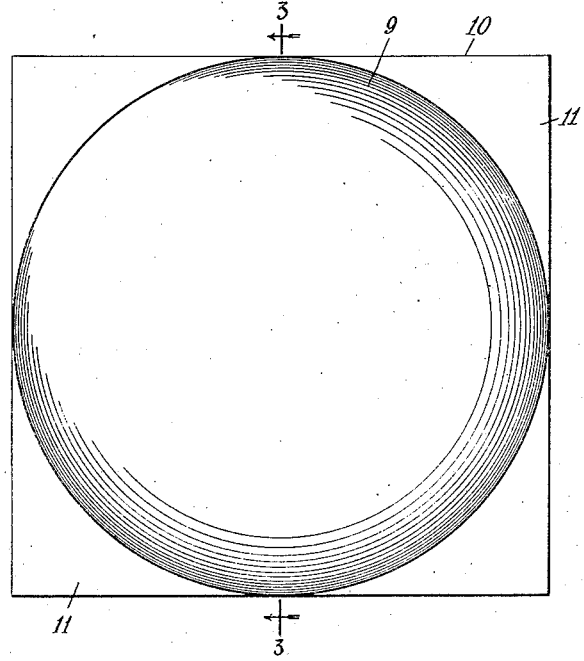
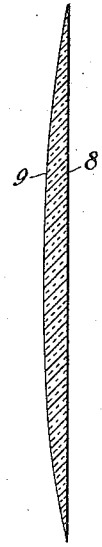
INVENTOR
David F. Newman
BY
William S. Pritchard
ATTORNEY Patented July 26, 1932

1,868,759

UNITED STATES PATENT OFFICE

DAVID F. NEWMAN, OF FREEPORT, NEW YORK, ASSIGNOR TO TRANS-LUX DAYLIGHT PICTURE SCREEN CORPORATION, OF NEW YORK, N. Y., A CORPORATION OF DELAWARE

PROJECTION SCREEN

Application filed July 21, 1926. Serial No. 123,842.

This invention relates to a screen for use with projection apparatus such as stereopticons, moving picture machines and the like, and more particularly to that type of projection screen which transmits the light from the source so that the projected image is viewed from the side of the screen away from the light source. This type of screen is commonly known as the translucent type and I shall, therefore, refer to my screen as a translucent screen, for the sake of simplicity of expression.

One of the difficulties in the use of a translucent projection screen is the fact that the source of light forms a comparatively bright spot near the center of the screen, this spot being commonly known as the "lens spot". By source of light I refer to the optical system as a whole, it being understood that the light reaches the screen from the objective lens or lenses. For the purpose of this application the objective may be considered as the source of light. The above difficulty may be overcome to some extent by use of a very heavy or comparatively opaque screen, but when such a screen is used it is necessary to employ a lamp with a high light intensity. Such a lamp is expensive and consumes a great deal of power to run and, moreover, there is increased danger of damaging by heat the objects which are to be projected on the screen.

It is the object of my invention to provide a projection screen of the translucent type which shall avoid the above difficulty and which shall result in illuminating the surface of the screen away from the source of light with a uniform brightness. This object I achieve by varying the diffusive quality of the screen, so constructing the screen as to cause sufficient diffusion adjacent the center to prevent the formation of the lens spot and decreasing the diffusive quality of the screen towards the edges. In the preferred form this result may be achieved by forming the screen in the shape of a lens thicker at the center than at the edges.

Referring now to the drawing in which I have shown a selected embodiment of my invention Figure 1 is a diagrammatic view of an optical system projecting light upon a screen constructed according to my invention, Figure 2 is a front view of one form which my screen may take, and Figure 3 is a section on the line 3—3 of Figure 2.

The optical system comprises the lamp 1 and reflector 2. The rays of light from the lamp and the reflector pass through the condenser 3 and the object 4 which may be a slide, film, or the like. The light then passes through the usual objective 5 to the screen 6. When this screen is translucent the eye of the observer will occupy some such position as that indicated at 7. The most advantageous position is on the center line of the optical system and screen as indicated.

When there is little or no diffusion of light passing through the screen, as in the case of perfectly transparent material, the eye of the observer will see only a small spot of light but this spot grows in size as the amount of diffusion caused by the screen increases. The same is true of all points on the screen. It is obvious that the intensity of the light coming from the objective 5, which for the purposes of this application I term the source of light, will decrease towards the edges of the screen, the intensity being greatest at the center.

I provide a screen having the property of diffusion and make this screen so that the amount of diffusion adjacent the center is greater than it is nearer the edges. This result may be achieved in various ways but I have found the preferred way to be the forming of the screen with varying thickness. For the purpose of illustration I have shown the screen as having a flat side 8 disposed towards the source of light and a spherical side 9 disposed away from the source of light. These configurations, however, are merely exemplary, it being obvious that the curve may be other than spherical and that the side 8 may also be curved. Again the side 9 may be formed of plane surfaces forming with the side 8 one or more prisms. The above are only given as examples of different forms which the screen may take and they are not intended to be limiting. The particular form of screen will depend upon the installation in which it is used and the details of design will vary accordingly.

The screen may be made of any suitable translucent material, such for example as that described and claimed in the patent to Troeger, 1,151,502, although other materials may be employed. If desired it may have a diffusing material incorporated therein, as described and claimed in the copending application of Arthur C. Payne, Serial No. 739,892 now Patent No. 1,672,656. The two sides may be left smooth or rough as desired.

It will be seen that a screen constructed according to my invention is in the form of a lens, the lens being formed by the sides 8 and 9. This construction will have the effect of converging the beams of light slightly so as to increase the intensity of illumination. Moreover, the diminishing thickness of the screen towards the edges compensates somewhat for the fact that the outer rays of light do not strike the screen as nearly normal thereto as do the rays nearer the center of the screen.

In Figure 2 I have shown the curved side of the screen and it will be noted that the surface is spherical in form and the circumference of the spherical portion is inscribed in the rectangle formed by the edges 10 of the screen. The portions 11 between the spherical portion and the corners may be of any suitable form desired. It is, of course, obvious that the boundary of the curved surface may be in the form of a circle circumscribed within the rectangle formed by the edges 10, or that the thickness of the screen may taper from the center to a uniform thickness at all parts of the edges.

From the above it will be apparent that I have provided a translucent screen which will result in an illumination of substantially uniform brightness, on the side of the screen away from the source of light. In actual practice it has been found that the so-called lens spot is unnoticeable. The greatest thickness occurs where the intensity of light is the greatest, and becomes less where the intensity is less. In its broadest aspect, therefore, my invention resides in the provision of a screen wherein the amount of diffusion caused by the screen varies approximately in proportion to the intensity of the light. In the particular embodiment shown this result is achieved by varying the thickness in approximate proportion to the intensity of light.

I am aware that various changes in details may be made from the specific embodiment which I have disclosed and, therefore, I do not intend to limit myself except by the appended claims.

I claim:

1. In a projection system, a source of light for illuminating an object from which images are to be projected, an objective lens traversed by a beam of light emanating from said source of light, and a screen with which said beam of light coacts, said screen being spaced a fixed distance from said source of light, having an area many times greater than that of said objective lens, and having light diffusive characteristics in different sections thereof approximately proportional to the light intensity at the respective sections.

2. In a projection system, a source of light, an objective lens traversed by a beam of light emanating from said source of light, and a screen with which said beam of light coacts, said screen having an area many times greater than that of said objective lens and having substantially different thicknesses in different sections thereof whereby said screen has light-diffusive characteristics in different sections thereof approximately proportional to the light intensity at the respective sections.

3. In a projection system, a source of light, an objective lens traversed by a beam of light emanating from said source of light, and a screen with which said beam of light coacts, said screen having an area many times greater than that of said objective lens and having one side substantially flat and the other side curved whereby said screen has light-diffusive characteristics in different sections thereof approximately proportional to the light intensity at the respective sections.

In testimony whereof, I have affixed my signature to this specification.

DAVID F. NEWMAN.